(12) United States Patent
Li et al.

(10) Patent No.: US 7,474,420 B2
(45) Date of Patent: Jan. 6, 2009

(54) IN-DIE OPTICAL METROLOGY

(75) Inventors: Shifang Li, Pleasanton, CA (US);
Junwei Bao, Palo Alto, CA (US); Vi Vuong, Fremont, CA (US)

(73) Assignee: Timbre Technologies, Inc., Santa Clara, CA (US)

( * ) Notice: Subject to any disclaimer, the term of this patent is extended or adjusted under 35 U.S.C. 154(b) by 366 days.

(21) Appl. No.: 11/396,164

(22) Filed: Mar. 30, 2006

(65) Prior Publication Data
US 2007/0229855 A1 Oct. 4, 2007

(51) Int. Cl.
*G01B 11/14* (2006.01)
*H01L 21/06* (2006.01)
*G06P 15/00* (2006.01)

(52) U.S. Cl. ............... 356/630; 356/625; 438/14; 438/16; 702/121

(58) Field of Classification Search ......... 356/614–640, 356/392, 394; 250/559.19, 559.2, 559.24; 700/95, 108, 121, 182; 438/14–16
See application file for complete search history.

(56) References Cited

U.S. PATENT DOCUMENTS

| | | | |
|---|---|---|---|
| 6,161,054 A * | 12/2000 | Rosenthal et al. ........... 700/121 |
| 6,298,470 B1 * | 10/2001 | Breiner et al. ................. 716/4 |
| 6,388,253 B1 * | 5/2002 | Su .......................... 250/310 |
| 6,433,878 B1 | 8/2002 | Niu et al. |
| 6,636,746 B1 * | 10/2003 | Hashem et al. .............. 455/522 |
| 6,785,638 B2 | 8/2004 | Niu |
| 6,885,446 B2 | 4/2005 | Machavariani et al. |
| 6,891,626 B2 | 5/2005 | Niu |
| 6,928,395 B2 | 8/2005 | Niu et al. |
| 6,943,900 B2 | 9/2005 | Niu |
| 7,065,423 B2 | 6/2006 | Prager et al. |
| 2002/0165636 A1 * | 11/2002 | Hasan ....................... 700/121 |
| 2004/0267397 A1 | 12/2004 | Doddi |
| 2005/0128489 A1 | 6/2005 | Bao |
| 2005/0264806 A1 | 12/2005 | Borden et al. |
| 2006/0009872 A1 * | 1/2006 | Prager et al. ................ 700/121 |

OTHER PUBLICATIONS

International Search Report and Written Opinion mailed Mar. 27, 2008, for PCT Application No. PCT/US07/07932 filed Mar. 29, 2007, 9 pages.
Haykin, Simon. (1999). *Neural Networks*. Prentice Hall: New Jersey.
Li, Lifeng. (1996). "Formulation and Comparison of Two Recursive Matrix Algorithms for Modeling Layered Diffraction Gratings," *J. Opt. Soc. Am.* A, 13: 1024-1035.

* cited by examiner

*Primary Examiner*—Sang Nguyen
(74) *Attorney, Agent, or Firm*—Morrison & Foerster LLP

(57) ABSTRACT

To determine one or more features of an in-die structure on a semiconductor wafer, a correlation is determined between one or more features of a test structure to be formed on a test pad and one or more features of a corresponding in-die structure. A measured diffraction signal measured off the test structure is obtained. One or more features of the test structure are determined using the measured diffraction signal. The one or more features of the in-die structure are determined based on the one or more determined features of the test structure and the determined correlation.

34 Claims, 7 Drawing Sheets

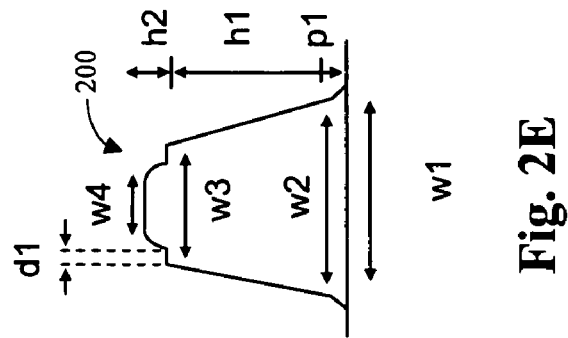
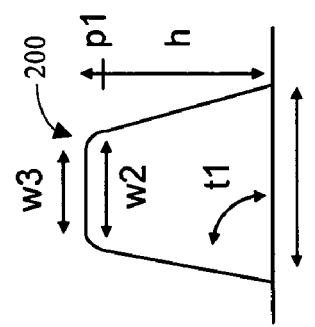
Fig. 2C
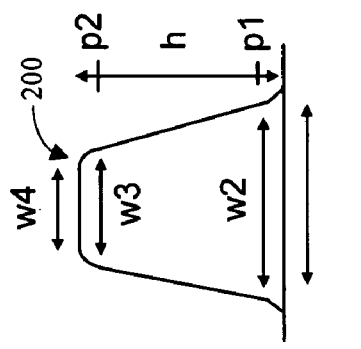
Fig. 2D
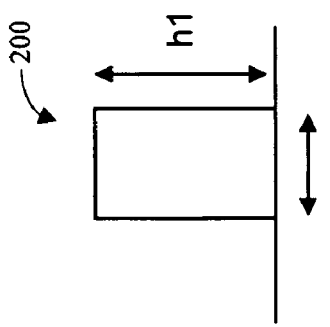
Fig. 2A
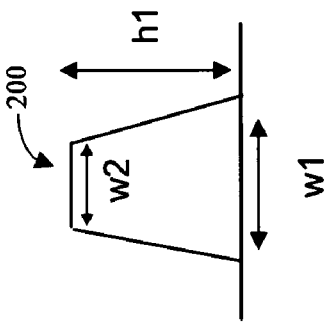
Fig. 2B

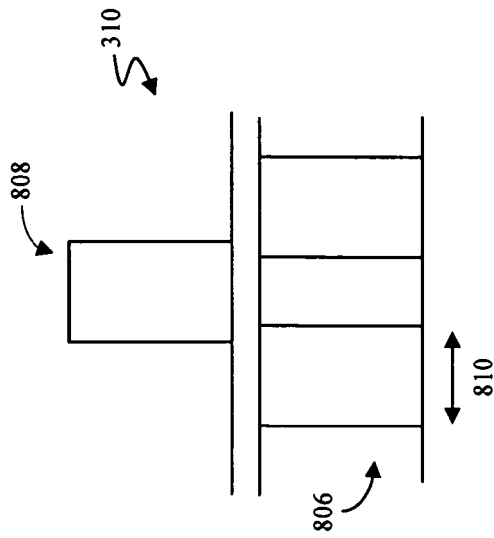
Fig. 8-C
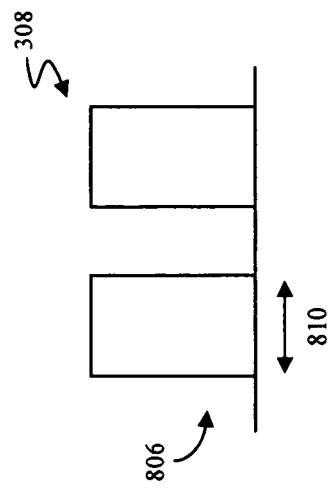
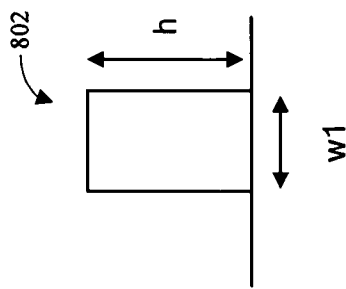
Fig. 8-A
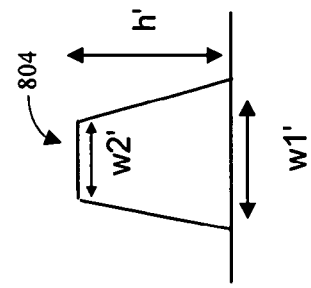
Fig. 8-B

IN-DIE OPTICAL METROLOGY

BACKGROUND

1. Field

The present application generally relates to examining a structure formed on a semiconductor wafer using optical metrology, and, more particularly, to determining one or more features of an in-die structure formed on a semiconductor wafer using optical metrology.

2. Description of the Related Art

Optical metrology involves directing an incident beam at a structure, measuring the resulting diffracted beam, and analyzing the diffracted beam to determine a feature of the structure. In semiconductor manufacturing, optical metrology is typically used for quality assurance. For example, after fabricating a test structure, such as a grating array, in a test pad, in proximity to a die on a semiconductor wafer, an optical metrology system is used to determine the profile of the test structure. By determining the profile of the test structure, the quality of the fabrication process utilized to form the test structure, and by extension the die proximate the test structure, can be evaluated.

In conventional optical metrology, it is typically assumed that the test structure in the test pad has the same profile as a structure in the die (i.e., an in-die structure). This assumption has limitations because the local environment can affect the fabrication process and alter the profile of the test structure in the test pad relative to the in-die structure.

SUMMARY

In one exemplary embodiment, to determine one or more features of an in-die structure on a semiconductor wafer, a correlation is determined between one or more features of a test structure to be formed on a test pad and one or more features of a corresponding in-die structure. A measured diffraction signal measured off the test structure is obtained. One or more features of the test structure are determined using the measured diffraction signal. The one or more features of the in-die structure are determined based on the one or more determined features of the test structure and the determined correlation.

DESCRIPTION OF THE DRAWING FIGURES

The present application can be best understood by reference to the following description taken in conjunction with the accompanying drawing figures, in which like parts may be referred to by like numerals:

FIGS. 2A-2E depict exemplary hypothetical profiles;

FIGS. 8A and 8B depicts profile parameters used to define hypothetical profiles;

FIG. 8C depicts a multi-level in-die structure; and

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

1. Optical Metrology

Figure 1:
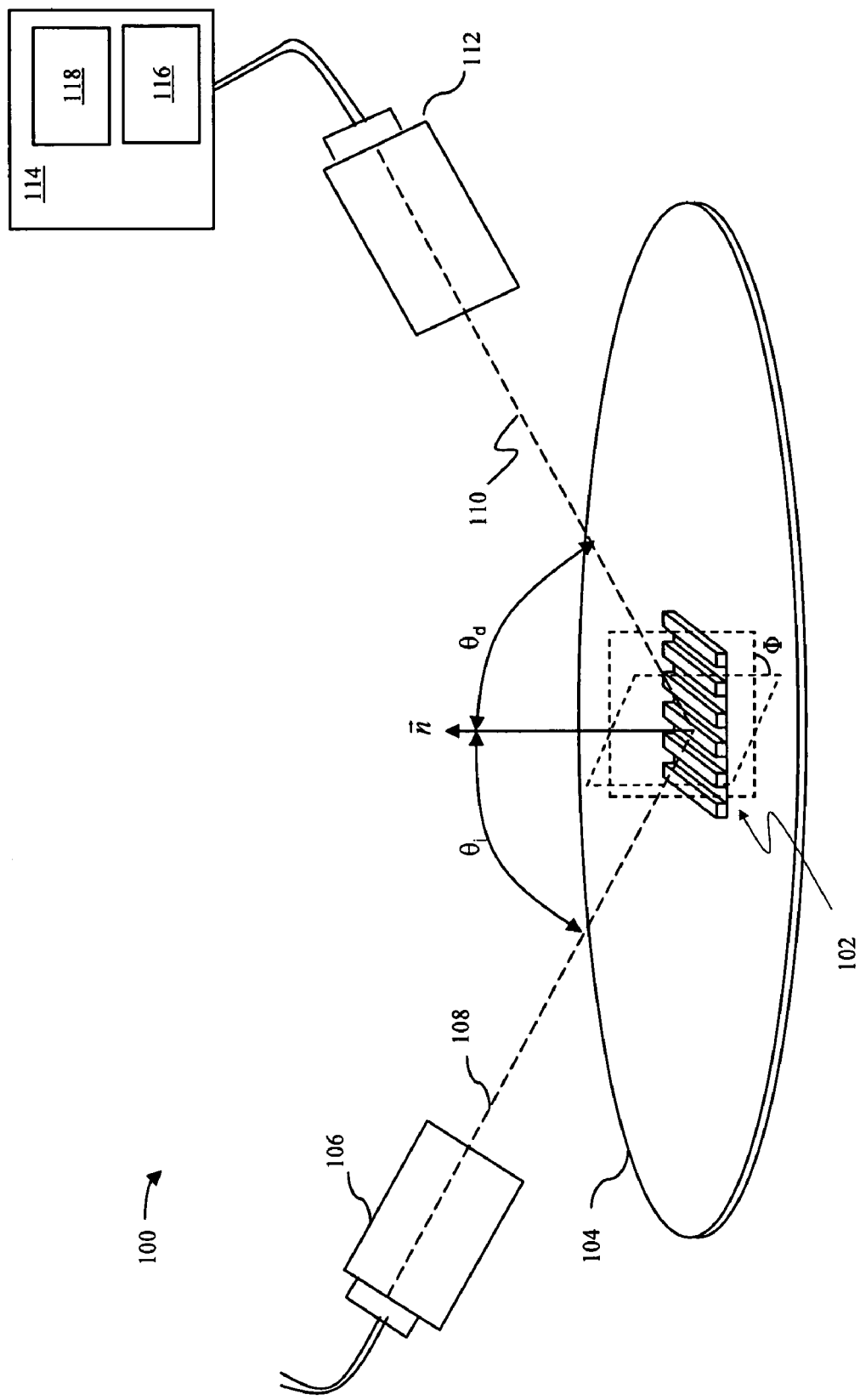
FIG. 1 is an exemplary optical metrology system.

With reference to FIG. 1, an optical metrology system 100 can be used to examine and analyze a structure formed on a semiconductor wafer 104. For example, optical metrology system 100 can be used to determine one or more features of a periodic grating 102 formed on wafer 104, such as one or more critical dimensions, profile, and the like. As described earlier, periodic grating 102 can be formed in a test pad on wafer 104, such as adjacent to a die formed on wafer 104. Periodic grating 102 can be formed in a scribe line and/or an area of the die that does not interfere with the operation of the die.

As depicted in FIG. 1, optical metrology system 100 can include a photometric device with a source 106 and a detector 112. Periodic grating 102 is illuminated by an incident beam 108 from source 106. The incident beam 108 is directed onto periodic grating 102 at an angle of incidence $\theta_i$ with respect to normal $\vec{n}$ of periodic grating 102 and an azimuth angle $\Phi$ (i.e., the angle between the plane of incidence beam 108 and the direction of the periodicity of periodic grating 102). Diffracted beam 110 leaves at an angle of $\theta_d$ with respect to normal and is received by detector 112. Detector 112 converts the diffracted beam 110 into a measured diffraction signal, which can include reflectance, tan ($\Psi$), cos($\Delta$), Fourier coefficients, and the like.

Optical metrology system 100 also includes a processing module 114 configured to receive the measured diffraction signal and analyze the measured diffraction signal. As described below, one or more features of periodic grating 102 can then be determined using a library-based process or a regression-based process.

2. Library-based Process of Determining Feature of Structure

In a library-based process of determining one or more features of a structure, the measured diffraction signal is compared to a library of simulated diffraction signals. More specifically, each simulated diffraction signal in the library is associated with a hypothetical profile of the structure. When a match is made between the measured diffraction signal and one of the simulated diffraction signals in the library or when the difference of the measured diffraction signal and one of the simulated diffraction signals is within a preset or matching criterion, the hypothetical profile associated with the matching simulated diffraction signal is presumed to represent the actual profile of the structure. The matching simulated diffraction signal and/or hypothetical profile can then be utilized to determine whether the structure has been fabricated according to specifications.

Thus, with reference again to FIG. 1, in one exemplary embodiment, after obtaining a measured diffraction signal, processing module 114 then compares the measured diffraction signal to simulated diffraction signals stored in a library 116. Each simulated diffraction signal in library 116 can be associated with a hypothetical profile. Thus, when a match is made between the measured diffraction signal and one of the simulated diffraction signals in library 116, the hypothetical profile associated with the matching simulated diffraction signal can be presumed to represent the actual profile of periodic grating 102.

The set of hypothetical profiles stored in library 116 can be generated by characterizing a hypothetical profile model using a set of profile parameters, then varying the set of profile parameters to generate hypothetical profiles of varying shapes and dimensions. The process of characterizing a profile using a set of profile parameters can be referred to as parameterizing.

For example, as depicted in FIG. 2A, assume that hypothetical profile 200 can be characterized by profile parameters h1 and w1 that define its height and width, respectively. As depicted in FIGS. 2B to 2E, additional shapes and features of hypothetical profile 200 can be characterized by increasing the number of profile parameters. For example, as depicted in FIG. 2B, hypothetical profile 200 can be characterized by profile parameters h1, w1, and w2 that define its height, bottom width, and top width, respectively. Note that the width of hypothetical profile 200 can be referred to as the critical dimension (CD). For example, in FIG. 2B, profile parameter w1 and w2 can be described as defining the bottom CD and top CD, respectively, of hypothetical profile 200.

As described above, the set of hypothetical profiles stored in library 116 (FIG. 1) can be generated by varying the profile parameters that characterize the hypothetical profile model. For example, with reference to FIG. 2B, by varying profile parameters h1, w1, and w2, hypothetical profiles of varying shapes and dimensions can be generated. Note that one, two, or all three profile parameters can be varied relative to one another.

With reference again to FIG. 1, the number of hypothetical profiles and corresponding simulated diffraction signals in the set of hypothetical profiles and simulated diffraction signals stored in library 116 (i.e., the resolution and/or range of library 116) depends, in part, on the range over which the set of profile parameters and the increment at which the set of profile parameters are varied. The hypothetical profiles and the simulated diffraction signals stored in library 116 are generated prior to obtaining a measured diffraction signal from an actual structure. Thus, the range and increment (i.e., the range and resolution) used in generating library 116 can be selected based on familiarity with the fabrication process for a structure and what the range of variance is likely to be. The range and/or resolution of library 116 can also be selected based on empirical measures, such as measurements using AFM, X-SEM, and the like.

For a more detailed description of a library-based process, see U.S. patent application Ser. No. 09/907,488, titled GENERATION OF A LIBRARY OF PERIODIC GRATING DIFFRACTION SIGNALS, filed on Jul. 16, 2001, which is incorporated herein by reference in its entirety.

3. Regression-based Process of Determining Feature of Structure

In a regression-based process of determining one or more features of a structure, the measured diffraction signal is compared to a simulated diffraction signal (i.e., a trial diffraction signal). The simulated diffraction signal is generated prior to the comparison using a set of profile parameters (i.e., trial profile parameters) for a hypothetical profile. If the measured diffraction signal and the simulated diffraction signal do not match or when the difference of the measured diffraction signal and one of the simulated diffraction signals is not within a preset or matching criterion, another simulated diffraction signal is generated using another set of profile parameters for another hypothetical profile, then the measured diffraction signal and the newly generated simulated diffraction signal are compared. When the measured diffraction signal and the simulated diffraction signal match or when the difference of the measured diffraction signal and one of the simulated diffraction signals is within a preset or matching criterion, the hypothetical profile associated with the matching simulated diffraction signal is presumed to represent the actual profile of the structure. The matching simulated diffraction signal and/or hypothetical profile can then be utilized to determine whether the structure has been fabricated according to specifications.

Thus, with reference again to FIG. 1, the processing module 114 can generate a simulated diffraction signal for a hypothetical profile, and then compare the measured diffraction signal to the simulated diffraction signal. As described above, if the measured diffraction signal and the simulated diffraction signal do not match or when the difference of the measured diffraction signal and one of the simulated diffraction signals is not within a preset or matching criterion, then processing module 114 can iteratively generate another simulated diffraction signal for another hypothetical profile. The subsequently generated simulated diffraction signal can be generated using an optimization algorithm, such as global optimization techniques, which includes simulated annealing, and local optimization techniques, which includes steepest descent algorithm.

The simulated diffraction signals and hypothetical profiles can be stored in a library 116 (i.e., a dynamic library). The simulated diffraction signals and hypothetical profiles stored in library 116 can then be subsequently used in matching the measured diffraction signal.

For a more detailed description of a regression-based process, see U.S. patent application Ser. No. 09/923,578, titled METHOD AND SYSTEM OF DYNAMIC LEARNING THROUGH A REGRESSION-BASED LIBRARY GENERATION PROCESS, filed on Aug. 6, 2001, which is incorporated herein by reference in its entirety.

4. Rigorous Coupled Wave Analysis

As described above, simulated diffraction signals are generated to be compared to measured diffraction signals. As will be described below the simulated diffraction signals can be generated by applying Maxwell's equations and using a numerical analysis technique to solve Maxwell's equations. It should be noted, however, that various numerical analysis techniques, including variations of RCWA, can be used.

In general, RCWA involves dividing a hypothetical profile into a number of sections, slices, or slabs (hereafter simply referred to as sections). For each section of the hypothetical profile, a system of coupled differential equations generated using a Fourier expansion of Maxwell's equations (i.e., the components of the electromagnetic field and permittivity ($\epsilon$)). The system of differential equations is then solved using a diagonalization procedure that involves eigenvalue and eigenvector decomposition (i.e., Eigen-decomposition) of the characteristic matrix of the related differential equation system. Finally, the solutions for each section of the hypothetical profile are coupled using a recursive-coupling schema, such as a scattering matrix approach. For a description of a scattering matrix approach, see Lifeng Li, "Formulation and comparison of two recursive matrix algorithms for modeling layered diffraction gratings," J. Opt. Soc. Am. A13, pp 1024-1035 (1996), which is incorporated herein by reference in its entirety. For a more detail description of RCWA, see U.S. patent application Ser. No. 09/770,997, titled CACHING OF INTRA-LAYER CALCULATIONS FOR RAPID RIGOR- OUS COUPLED-WAVE ANALYSES, filed on Jan. 25, 2001, which is incorporated herein by reference in its entirety.

5. Machine Learning Systems

The simulated diffraction signals can be generated using a machine learning system (MLS) employing a machine learning algorithm, such as back-propagation, radial basis function, support vector, kernel regression, and the like. For a more detailed description of machine learning systems and algorithms, see "Neural Networks" by Simon Haykin, Prentice Hall, 1999, which is incorporated herein by reference in its entirety. See also U.S. patent application Ser. No. 10/608, 300, titled OPTICAL METROLOGY OF STRUCTURES FORMED ON SEMICONDUCTOR WAFERS USING MACHINE LEARNING SYSTEMS, filed on Jun. 27, 2003, which is incorporated herein by reference in its entirety.

In one exemplary embodiment, the simulated diffraction signals in a library of diffraction signals, such as library 116 (FIG. 1), used in a library-based process are generated using a MLS. For example, a set of hypothetical profiles can be provided as inputs to the MLS to produce a set of simulated diffraction signals as outputs from the MLS. The set of hypothetical profiles and set of simulated diffraction signals are stored in the library.

In another exemplary embodiment, the simulated diffractions used in regression-based process are generated using a MLS, such as MLS 118 (FIG. 1). For example, an initial hypothetical profile can be provided as an input to the MLS to produce an initial simulated diffraction signal as an output from the MLS. If the initial simulated diffraction signal does not match the measured diffraction signal, another hypothetical profile can be provided as an additional input to the MLS to produce another simulated diffraction signal.

FIG. 1 depicts processing module 114 having both a library 116 and MLS 118. It should be recognized, however, that processing module 114 can have either library 116 or MLS 118 rather than both. For example, if processing module 114 only uses a library-based process, MLS 118 can be omitted. Alternatively, if processing module 114 only uses a regression-based process, library 116 can be omitted. Note, however, a regression-based process can include storing hypothetical profiles and simulated diffraction signals generated during the regression process in a library, such as library 116.

6. Defining Test Structure in Test Pad and In-Die Structure

Figure 3:
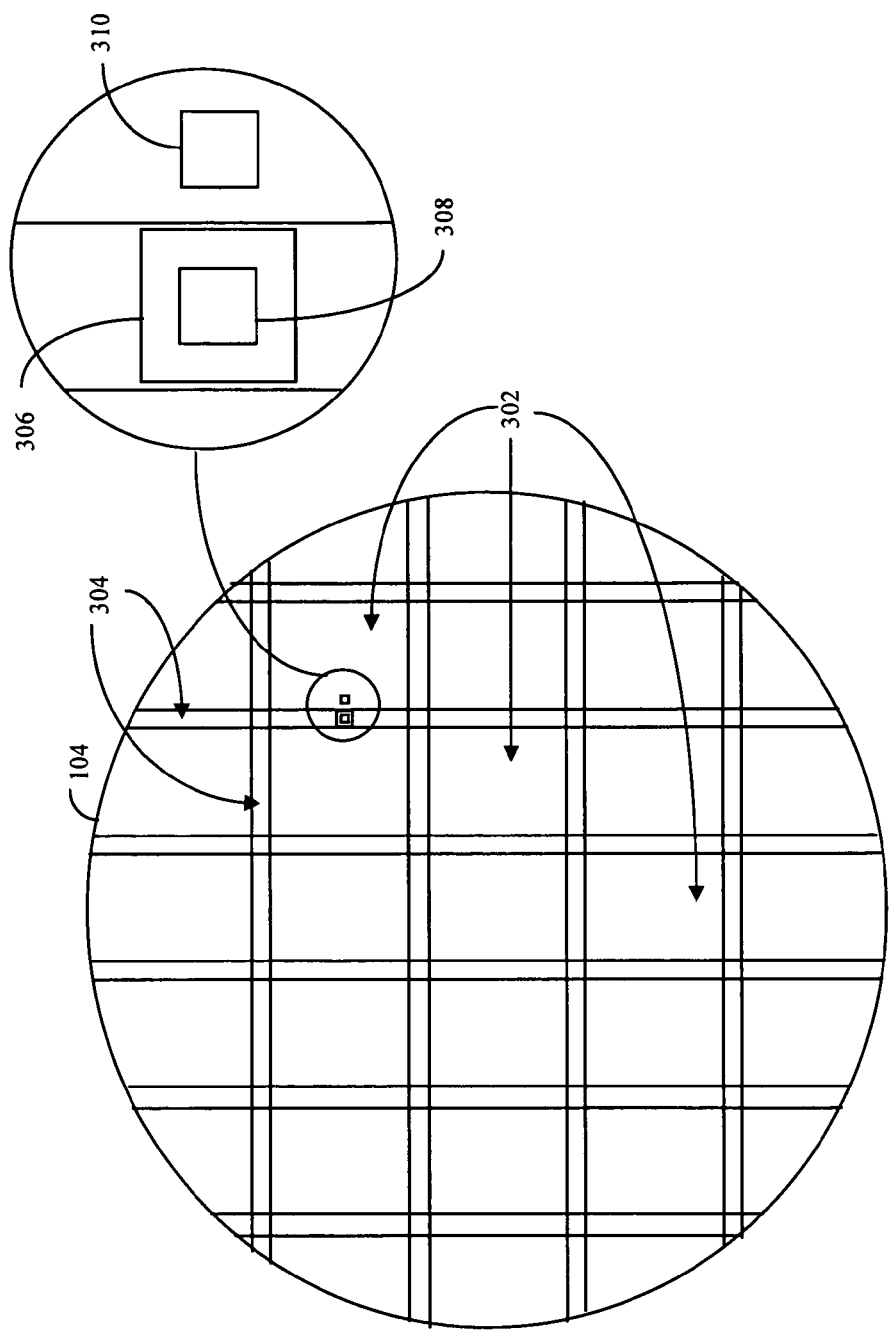
FIG. 3 depicts an exemplary wafer with dies and scribe lines.

FIG. 3 depicts wafer 104 having a plurality of dies 302 and scribe lines 304 defined between the dies 302. In one exemplary embodiment, a test pad 306 is defined with a test structure 308 to be formed in test pad 306. In FIG. 3, test pad 306 is depicted as being disposed within a scribe line 304. It should be recognized, however, that test pad 306 can be disposed within a die 302, such as in an area of die 302 large enough to accommodate test pad 306 without interfering with the operation of die 302. It should also be recognized that test pad 306 may not be an actual physical structure formed on wafer 104. Instead, test pad 306 may designate an area on wafer 104 in which test structure 308 is formed.

In the present exemplary embodiment, test structure 308 in test pad 306 has a corresponding structure 310 to be formed in die 302 (i.e., a corresponding in-die structure 310). Test structure 308 can be designed and fabricated under conditions such that some of its properties are correlated to in-die structure 310. For example, test structure 308 can be a thin-film stack fabricated with materials and having dimensions that are similar to in-die structure 310.

Although a single test pad 306 and a single test structure 308 are depicted in FIG. 3, it should be recognized that any number of test pads 306 and/or any number of test structures 308 can be defined to correspond to in-die structure 310. For example, test pad 306 can include a set of test structures 308 that vary in material, shape, and dimensions. As a further example, test structures 308 can be periodic gratings of varying pitch, grating orientations, and/or line to width ratios.

Furthermore, a set of test pads 306 be designed with varying sensitivity to the profile parameters of the in-die structures. For example, assume that the features to be determined for the in-die structure include top CD, bottom CD, thickness of stack films, and line-end shortening. One test structure can be designed to have thin film pads that have same stack or stacks as the stack or stacks in the in-die structure. Another test structure can be designed with CD that correlates well with line-end shortening of the in-die structure.

7. Determining Feature of In-Die Structure Using Correlation

Figure 4:
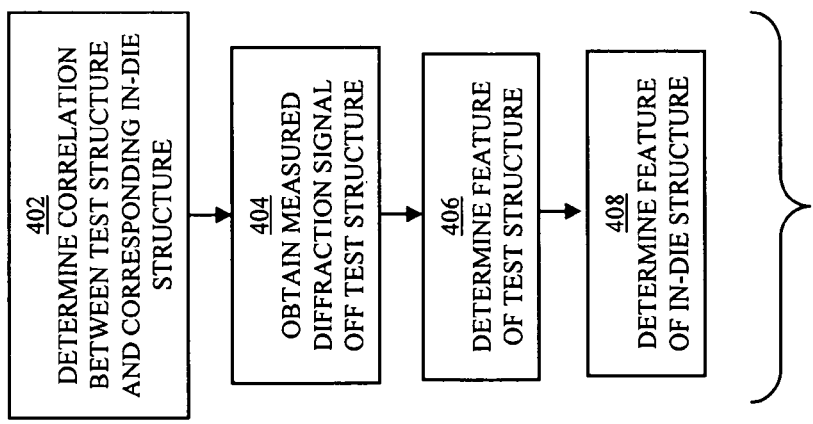
FIG. 4 depicts an exemplary process of determining one or more features of an in-die structure.

FIG. 4 depicts an exemplary process of determining one or more features of an in-die structure using a correlation determined between a test structure in a test pad and a corresponding in-die structure. With reference to FIG. 3, as noted above, any number of test pads 306 and any number of test structures 308 can be defined to correspond to in-die structure 310. Also, test pad 306 can be formed in scribe lines 304 or in a die 302.

In step 402 (FIG. 4) of the present exemplary process, a correlation between test structure 308 and corresponding in-die structure 310 is determined. The correlation can be determined through simulation or actual fabrication. In particular, a set of test structures 308 and a set of in-die structures 310 can be simulated or fabricated on one or more test wafers. One or more features of the test structures 308 in the simulated or fabricated set of test structures 308 can be correlated to one or more features of the in-die structures 310 in the simulated or fabricated set of in-die structures 310. For example, a bottom CD of the test structures 308 can be correlated to a bottom CD of the in-die structures 310. The correlation can be linear, parabolic, and the like.

After the correlation has been determined in step 402 (FIG. 4), an actual production wafer is fabricated with test structure 308 formed on the production wafer. In step 404 (FIG. 4) of the present exemplary process, a measured diffraction signal measured off test structure 308 formed on the production wafer is obtained. As described above, the measured diffraction signal can be measured using a photometric device of an optical metrology system. The measured diffraction signal can be obtained directly from the photometric device, or obtained from a buffer, memory, or other storage medium.

In step 406 (FIG. 4), one or more features of test structure 308 are determined based on the measured diffraction signal. As also described above, a library-based or regression-based process can be used to determine one or more features, such as the profile, of test structure 308.

In step 408 (FIG. 4), one or more features of a corresponding in-die structure 310 is determined based on the one or more features of test structure 308 determined in step 406 (FIG. 4) and the correlation determined in step 402 (FIG. 4). For example, assume a bottom CD of test structure 308 was determined in step 406 (FIG. 4). Thus, in this example, a bottom CD of in-die structure 310 is determined based on the bottom CD determined for test structure 308 in step 406 (FIG. 4) and the correlation between the bottom CD of in-die structure 310 and the bottom CD of test structure 308 determined in step 402 (FIG. 4).

In one exemplary embodiment, the one or more features of in-die structure 310 determined in step 408 (FIG. 4) are of an in-die structure 310 that is formed on the same production wafer as test structure 308. In particular, in this embodiment, in-die structure 310 is formed adjacent to test structure 308 on the same production wafer. In another exemplary embodiment, the one or more features of in-die structure 310 determined in step 408 (FIG. 4) are of an in-die structure 310 that is formed on another production wafer as test structure 308.

Thus, using the exemplary process described above, one or more features of in-die structure 310 can be determined without actually examining in-die structure 310. This may be particularly advantageous when it is difficult to actually measure in-die structure 310. For example, in-die structure 310 may be formed in an area of a die that is not big enough to measure using an optical metrology system.

Figure 5:
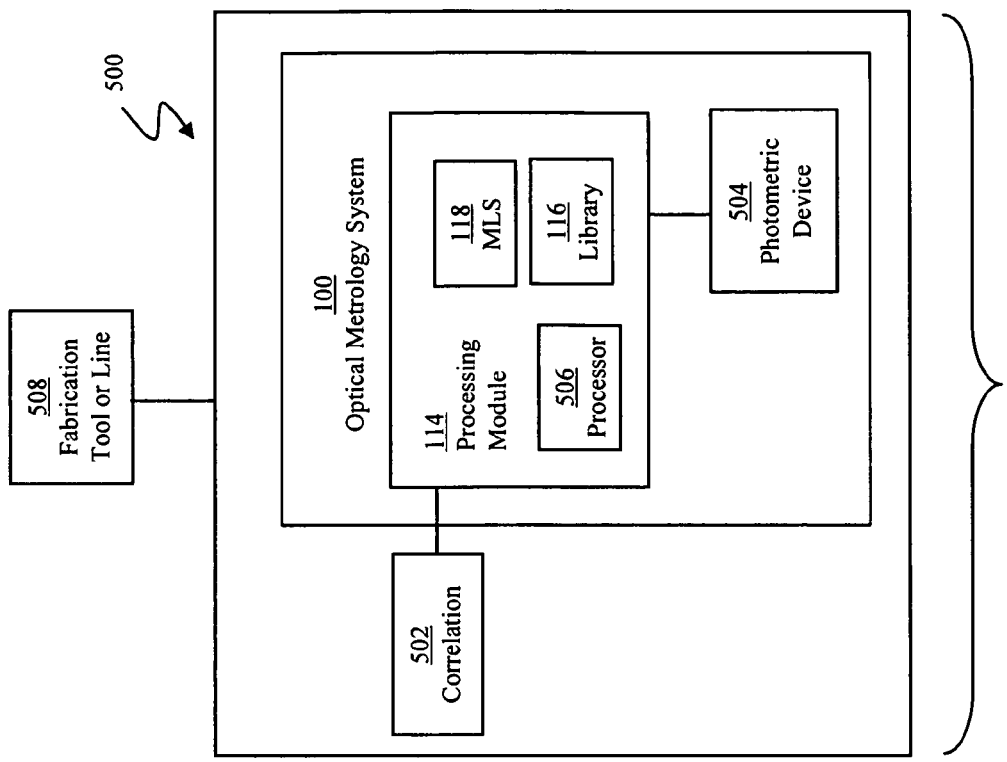
FIG. 5 depicts an exemplary system configured to determine one or more features of an in-die structure.

FIG. 5 depicts an exemplary system 500 configured to determine one or more features of an in-die structure. Exemplary system 500 includes a correlation 502 of test structures and in-die structure. As described above, correlation 502 can be determined in advance through simulation or fabrication of test wafers. Correlation 502 can be embodied in any storage medium, such as a portion of memory, disk drive, and the like.

Exemplary system 500 also includes optical metrology system 100 with a photometric device 504, which can include source 106 and detector 112 (FIG. 1). When correlation 502 is determined in advance from fabricating test wafer, optical metrology system 100 can be used to determine the features of the test structures and in-die structures used in determining correlation 502.

To determine one or more features of an in-die structure, photometric device 504 is used to measure a measured diffraction signal from a test structure in a test pad on a wafer. Processor 506 can obtain the measured diffraction signal directly from photometric device 504 or from a buffer, memory, or other storage medium. Processor 506 in processing module 114 is configured to determine one or more features of the test structure in the test pad using the measured diffraction signal. Processor 506 is also configured to determine one or more features of the corresponding in-die structure based on the determined one or more features of the test structure and correlation 502.

As noted above, it should be recognized that processing module 114 need not include both library 116 and MLS 118. For example, when only a library-based process is used, MLS 118 can be omitted. Alternatively, when only a regression-based process is used, library 116 can be omitted.

Additionally, it should be recognized that exemplary system 500 can be implemented as an in-line system, meaning that exemplary system 500 is integrated with a fabrication tool or line 508 to examine and evaluate wafers as the wafers are being processed in fabrication tool or line 508. Alternatively, exemplary system 500 can be implemented as an off-line system, meaning that exemplary system 500 is used to examine and evaluate wafers after they have been processed by fabrication tool or line 508. For example, after being processed on fabrication tool or line 508, wafers can be transferred to exemplary system 500 to be examined and evaluated.

8. Directly Determining Feature of In-Die Structure

Figure 6:
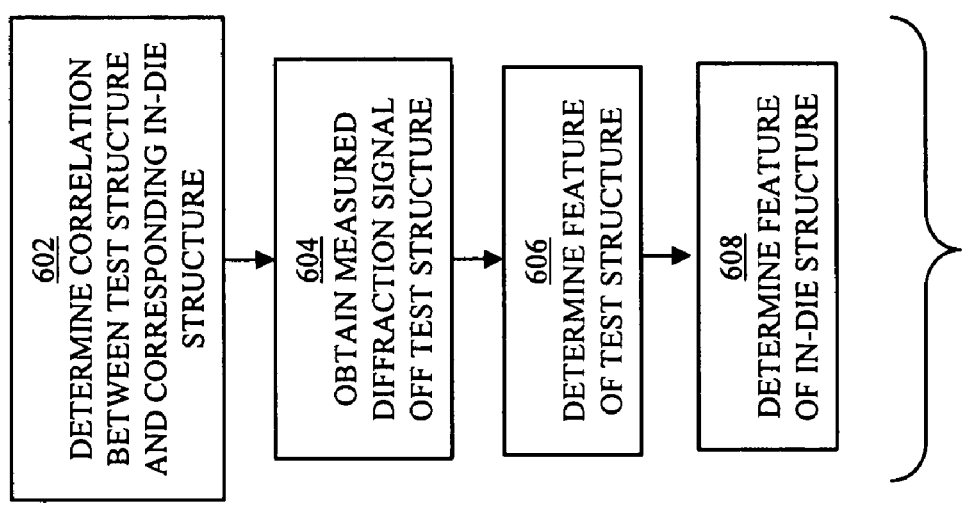
FIG. 6 depicts another exemplary process of determining one or more features of an in-die structure.

FIG. 6 depicts an exemplary process of determining one or more features of an in-die structure using a correlation determined between a test structure in a test pad and a corresponding in-die structure and a measured diffraction signal from the in-die structure. In contrast to the exemplary process depicted in FIG. 4 and described above, in the present exemplary process, the in-die structure is examined using an optical metrology system.

In step 602 of the present exemplary process, a correlation between a test structure and a corresponding in-die structure is determined. The correlation determined in the present step of the present exemplary process can be similar to the correlation determined in step 402 of the exemplary process depicted in FIG. 4 and described above.

After the correlation has been determined in step 602, an actual production wafer is fabricated with a test structure and a corresponding in-die structure formed on the production wafer. In step 604 of the present exemplary process, a measured diffraction signal measured off the test structure formed on the production wafer is obtained. As described above, the measured diffraction signal can be measured using a photometric device of an optical metrology system. The measured diffraction signal can be obtained directly from the photometric device, or obtained from a buffer, memory, or other storage medium. Step 604 of the present exemplary process can be similar to step 404 of the exemplary process depicted in FIG. 4 and described above.

In step 606, one or more features of the test structure are determined based on the measured diffraction signal. As also described above, a library-based or regression-based process can be used to determine one or more features, such as the profile, of the test structure. Step 606 of the present exemplary process can be similar to step 406 of the exemplary process depicted in FIG. 4 and described above.

In step 608, one or more features of the corresponding in-die structure are determined based on the one or more features of the test structure determined in step 606 and the correlation determined in step 602. In addition to the determined one or more features of the test structure and the determined correlation, in step 608 of the present exemplary process, one or more features of the corresponding in-die structure is determined based on a measured signal measured off the corresponding in-die structure formed on the production wafer.

Figure 7:
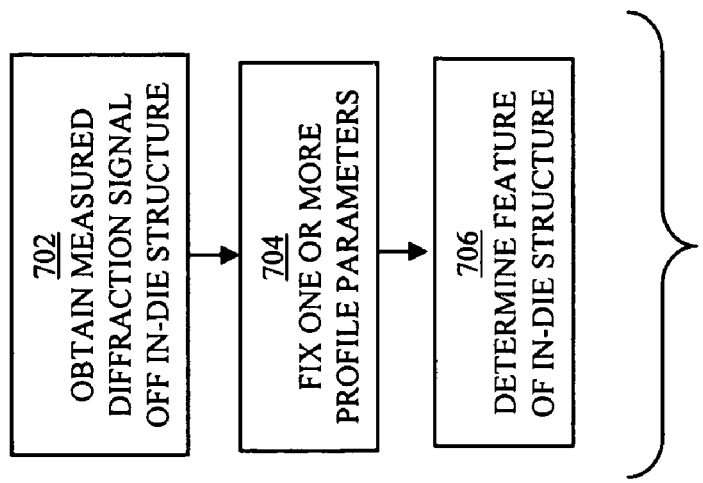
FIG. 7 depicts still another exemplary process of determining one or more features of an in-die structure.

In particular, as depicted in FIG. 7, step 608 (FIG. 6) includes a step 702 in which a measured diffraction signal measured off a corresponding in-die structure is obtained. The measured diffraction signal measured off the corresponding in-die structure can be measured using the same photometric device used to obtain the measured diffraction signal measured off the test structure on the production wafer in step 604.

In one exemplary embodiment, the measured diffraction signal in step 702 was measured off a corresponding in-die structure formed adjacent to the test structure on the same wafer from which the measured diffraction signal in step 604 (FIG. 6) was measured. In another exemplary embodiment, measured diffraction signal in step 702 was measured off a corresponding in-die structure that is formed on a different wafer than the wafer on which the test structure from which the measured signal in step 604 (FIG. 6) was measured was formed on.

In step 704, one or more profile parameters of a hypothetical profile of the corresponding in-die structure to be used in determining one or more features of the corresponding in-die structure are fixed based on the one or more features of the test structure determined in step 606 and the correlation determined in step 602. In particular, as described above, a library-based or regression-based process can be used to determine one or more features of a structure in optical metrology. As also described above, in both processes, the profile of the structure is characterized using a hypothetical profile defined using a set of profile parameters. In the present exemplary embodiment, one or more of the profile parameters used in a library-based or regression-based process are fixed based on the one or more features of the test structure determined in step 606 and the correlation determined in step 602.

It should be recognized that steps 702 and 704 can be performed in any order. For example, step 702 can be performed in advance of step 704, step 704 can be performed in advance of step 702, or steps 702 and 704 can be performed concurrently.

In step 706, one or more features of the in-die structure are determined based on the measured diffraction signal obtained in step 702 and the one or more profile parameters fixed in step 704. In particular, the profile parameters that were not fixed in step 704 can be determined in step 706.

For example, as depicted in FIG. 8-A, assume that a hypothetical profile 802 for the test structure is defined by two profile parameters (i.e., w1 (corresponding to the bottom CD of the test structure) and h (corresponding to the height of the test structure)). As depicted in FIG. 8-B, assume that a hypothetical profile 804 for the in-die structure is defined by three profile parameters (i.e., w1' (corresponding to the bottom CD of the in-die structure), w2' (corresponding to the top CD of the in-die structure), and h' (corresponding to the height of the in-die structure)).

Thus, in the present example, in step 606 (FIG. 6), the bottom CD (corresponding to profile parameter w1) and the height (corresponding to profile parameter h) of the test structure is determined based on the measured diffraction signal measured off the test structure in step 604 (FIG. 6). In step 702 (FIG. 7), a measured diffraction signal measured off the in-die structure is obtained. In step 704 (FIG. 7), values for profile parameters w1' and h' of hypothetical profile 804 for the in-die structure are fixed based on the values of the bottom CD and the height determined for the test structure in step 606 (FIG. 6) and the correlation determined in step 602 (FIG. 6). In step 706 (FIG. 7), the top CD of the in-die structure can be determined based on the measured diffraction signal obtained in step 702 (FIG. 7) and the values for the bottom CD (corresponding to profile parameter w1') and height (corresponding to profile parameter h') fixed in step 704 (FIG. 7).

It should be recognized that the particular profile parameters and the number of profile parameters mentioned above are provided for purpose of clarity. As mentioned above, any number of profile parameters can be used to characterize various features of a structure. For example, profile parameters can define characteristics of layers of materials, including compositions and thicknesses, that form the structure and one or more underlying layers.

In another example, as depicted in FIG. 8-C, assume that in-die structure 310 is a complex structure having a bottom structure 806 and a top structure 808. In the present example, test structure 308 is formed to correspond to only bottom structure 806 of in-die structure 310.

Thus, in the present example, in step 602 (FIG. 6), the correlation between test structure 308 and the bottom structure 806 of in-die structure 310 is determined. In step 604 (FIG. 6), a measured diffraction signal measured off test structure 308 formed on a production wafer is obtained. In step 606 (FIG. 6), one or more features of test structure 308 are determined. For the sake of example, assume a bottom CD 810 of test structure 308 is determined. In step 702 (FIG. 7), a measured diffraction signal measured off in-die structure 310 having bottom structure 806 and top structure 808 is obtained. In step 704 (FIG. 7), one or more profile parameters of the hypothetical profile of in-die structure 310 are fixed based on the one or more features of test structure 308 determined in step 606 (FIG. 6) (in this example, bottom CD 810) and the correlation determined in step 602 (FIG. 6). In step 706 (FIG. 7), one or more features of the in-die structure are determined based on the measured diffraction signal obtained in step 702 (FIG. 7) and the one or more profile parameters fixed in step 704 (FIG. 7) (in this example, the profile parameter corresponding to bottom CD 810).

In one exemplary embodiment, the measured diffraction signal obtained in step 604 (FIG. 6) can be obtained after the wafer has been processed to form test structure 308 and bottom section 806 of in-die structure 310, but before the top section 808 of in-die structure 310 has been formed. The measured diffraction signal obtained in step 702 (FIG. 7) can then be obtained after the wafer has been processed to form top section 808 of in-die structure 310. Alternatively, in another exemplary embodiment, the measured diffraction signal obtained in step 604 (FIG. 6) can be obtained after the wafer has been processed to form test structure 308 and both bottom section 806 and top section 808 of in-die structure 310.

Figure 9:
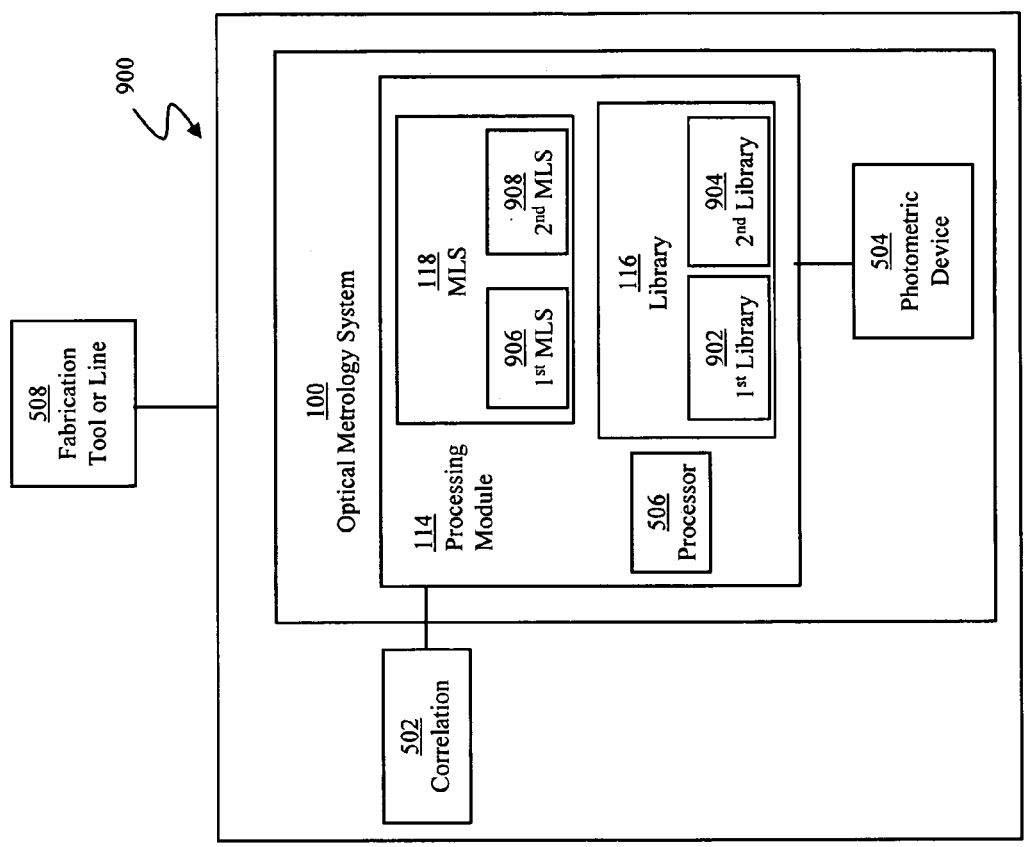
FIG. 9 depicts another exemplary system configured to determine one or more features of an in-die structure.

FIG. 9 depicts an exemplary system 900 configured to determine one or more features of an in-die structure using a correlation determined between a test structure in a test pad and a corresponding in-die structure and a measured diffraction signal from the in-die structure. Exemplary system 900 includes a correlation 502 of test structures and in-die structure. As described above, correlation 502 can be determined in advance through simulation or fabrication of test wafers. Correlation 502 can be embodied in any storage medium, such as a portion of memory, disk drive, and the like.

Exemplary system 900 also includes optical metrology system 100 with a photometric device 504, which can include source 106 and detector 112 (FIG. 1). When correlation 502 is determined in advance from fabricating test wafer, optical metrology system 100 can be used to determine the one or more features of the test structures and in-die structures used in determining correlation 502.

To determine one or more features of an in-die structure, photometric device 504 is used to measure a measured diffraction signal from a test structure in a test pad on a wafer. Processor 506 can obtained the measured diffraction signal directly from the photometric device or from a buffer, memory, or other storage medium. Processor 506 is configured to determine one or more features of the test structure in the test pad using the measured diffraction signal. Processor 506 is also configured to determine one or more features of the corresponding in-die structure based on the determined feature of the test structure, correlation 502, and a measured diffraction signal measured off the in-die structure.

In particular, processor 506 is configured to obtain a measured diffraction signal measured off a corresponding in-die structure. Processor 506 is configured to fix one or more profile parameters of a hypothetical profile of the corresponding in-die structure based on the determined one or more features of the test structure and correlation 502. Processor 506 then determines one or more features of the in-die structure based on the measured diffraction signal measured off the in-die structure and the fixed one or more profile parameters.

As depicted in FIG. 9, in one exemplary embodiment, when a library-based processed is used to determine one or more features of a test structure or in-die structure based on a measured diffraction signal obtained using photometric device 504, library 116 can include a first library 902 and a second library 904. It should be recognized that first library 902 and second library 904 can be portions of one library or separate libraries.

In the present exemplary embodiment, first library 902 includes sets of hypothetical profiles of the test structure and corresponding simulated diffraction signals. Thus, first library 902 is used in determining one or more features of the test structure based on a measured diffraction signal measured off the test structure.

Second library 904 includes sets of hypothetical profiles of the in-die structure with one or more profile parameters fixed and corresponding simulated diffraction signals. For example, returning to the example described above where a profile parameter corresponding to the bottom CD of the in-die structure is fixed based on the bottom CD determined for the test structure, second library 904 includes sets of hypothetical profiles with the fixed value for the profile parameter corresponding to the bottom CD. Second library 904 is used in determining one or more features of the in-die structure based on the measured diffraction signal measured off the in-die structure and the fixed one or more profile parameters, such as the profile parameter corresponding to the bottom CD described above. In particular, the measured diffraction signal measured off the in-die structure can be compared only to the simulated diffraction signals in second library 904 with corresponding hypothetical profiles with the fixed values of the one or more profile parameters, such as the profile parameter corresponding to the bottom CD described above.

In one exemplary embodiment, the simulated diffraction signals to be included in second library 904 can be generated by fixing values of the one or more profile parameters corresponding to the one or more features determined for the test structure. For example, assuming the bottom CD of the test structure is determined, the corresponding profile parameter of the bottom CD in the hypothetical profile of the in-die structure can be fixed in generating a corresponding simulated diffraction signal for the hypothetical profile. The simulated diffraction signal and the hypothetical profile are then stored in second library 904.

Alternatively, in another exemplary embodiment, the simulated diffraction signals to be included in second library 904 can be generated by floating all profile parameters. As described above, the measured diffraction signal measured off the in-die structure can be compared only to the simulated diffraction signals in second library 904 with corresponding hypothetical profiles with the fixed values of the one or more profile parameters. Additionally, the one or more profile parameters can be fixed during the time the measured diffraction signal is being compared to the simulated diffraction signals in second library 904. See U.S. patent application Ser. No. 10/735,212, titled PARAMETRIC OPTIMIZATION OF OPTICAL METROLOGY MODEL, filed on Dec. 12, 2003, which is incorporated herein by reference in its entirety.

As also depicted in FIG. 9, in one exemplary embodiment, when a machine learning system (MLS) is used to determine one or more features of a test structure or in-die structure based on measured diffraction signal measured using photometric device 504, MLS 118 can include a first MLS 906 and a second MLS 908. It should be recognized that first MLS 906 and second MLS 908 can be portions of one MLS or separate MLSs.

In the present exemplary embodiment, first MLS 906 is configured to receive hypothetical profiles of the test structure as inputs and provide corresponding simulated diffraction signals as outputs. Thus, first MLS 906 can be used in a regression-based process to determine one or more features of the test structure based on a measured diffraction signal measured off the test structure.

Second MLS 908 is configured to receive hypothetical profiles of the in-die structure with one or more profile parameters fixed as inputs and provide corresponding simulated diffraction signals as outputs. For example, returning to the example described above where a profile parameter corresponding to the bottom CD of the in-die structure is fixed based on the bottom CD determined for the test structure, second MLS 908 is configured to receive hypothetical profiles with the fixed value for the profile parameter corresponding to the bottom CD. Second MLS 908 can be used in a regression-based process to determine one or more features of the in-die structure based on the measured diffraction signal measured off the in-die structure and the fixed one or more profile parameters, such as the profile parameter corresponding to the bottom CD described above.

Second MLS 908 can be trained using hypothetical profiles of the in-die structure with one or more profile parameters fixed. Alternatively, second MLS 908 can be trained using hypothetical profiles of the in-die structure with all profile parameters floating. When second MLS 908 is trained with all profile parameters floating, the one or more profile parameters can be fixed when second MLS 908 is used in a regression-based process.

As noted above, it should be recognized that processing module 114 need not include both library 116 and MLS 118. For example, when only a library-based process is used, MLS 118 can be omitted. Alternatively, when only a regression-based process is used, library 116 can be omitted.

Additionally, it should be recognized that exemplary system 900 can be implemented as an in-line system, meaning that exemplary system 900 is integrated with a fabrication tool or line to examine and evaluate wafers as the wafers are being processed in the fabrication tool or line. Alternatively, exemplary system 900 can be implemented as an off-line system, meaning that exemplary system 900 is used to examine and evaluate wafers after they have been processed by a fabrication tool or line. For example, after being processed on a fabrication tool or line, wafers can be transferred to exemplary system 900 to be examined and evaluated.

Although exemplary embodiments have been described, various modifications can be made without departing from the spirit and/or scope of the present invention. Therefore, the present invention should not be construed as being limited to the specific forms shown in the drawings and described above.

We claim:

1. A method of determining one or more features of an in-die structure on a semiconductor wafer, the method comprising:
   a) determining a correlation between one or more features of a test structure to be formed in a test pad and one or more features of a corresponding in-die structure to be formed in a die;
   b) obtaining a measured diffraction signal measured off the test structure;
   c) determining one or more features of the test structure using the measured diffraction signal obtained in b); and
   d) determining one or more features of the in-die structure based on the one or more features of the test structure determined in c) and the correlation determined in a).

2. The method of claim 1, wherein the correlation in a) is determined using simulations of the test structure and the corresponding in-die structure.

3. The method of claim 1, wherein the correlation in a) is determined using test structures and corresponding in-die structures fabricated on test wafers.

4. The method of claim 1, wherein the measured diffraction signal obtained in b) was measured off the test structure formed on a wafer, and wherein the one or more features determined in d) are of the in-die structure formed on the wafer adjacent to the test structure formed on the wafer.

5. The method of claim 1, wherein the measured diffraction signal obtained in b) was measured off the test structure formed on a first wafer, and wherein the one or more features determined in d) are of the in-die structure formed on a second wafer.

6. The method of claim 1, wherein c) comprises:
comparing the measured diffraction signal obtained in b) to a library of simulated diffraction signals and corresponding hypothetical profiles of the test structure to determine a closest matching simulated diffraction signal in the library; and
determining the one or more features of the test structure based on the hypothetical profile of the test structure in the library corresponding to the closest matching simulated diffraction signal.

7. The method of claim 1, wherein c) comprises:
generating a first simulated diffraction signal using a first hypothetical profile of the test structure;
comparing the measured diffraction signal to the first simulated diffraction signal;
if the measured diffraction signal and the first simulated diffraction signal match within a matching criterion, determining one or more features of the test structure based on the first hypothetical profile; and
if the measured diffraction signal and the first simulated diffraction signal do not match within the matching criterion, generating a second simulated diffraction signal using a second hypothetical profile of the test structure and comparing the measured diffraction signal to the second simulated diffraction signal.

8. The method of claim 1, wherein the one or more features of the in-die structure is determined in d) without obtaining a measured diffraction signal measured off the in-die structure.

9. The method of claim 1, wherein d) comprises:
e) obtaining a measured diffraction signal measured off the in-die structure;
f) fixing values of one or more profile parameters of a hypothetical profile of the in-die structure based on the one or more features of the test structure determined in c); and
g) determining the one or more features of the in-die structure based on the measured diffraction signal obtained in e) and the one or more profile parameters fixed in f).

10. The method of claim 9, wherein the measured diffraction signal obtained in b) was measured off the test structure formed on a wafer, wherein the measured diffraction signal obtained in e) was measured off the in-die structure formed on the wafer adjacent to the test structure formed on the wafer, and wherein the one or more features determined in g) are of the in-die structure formed on the wafer adjacent to the test structure formed on the wafer.

11. The method of claim 9, wherein the measured diffraction signal obtained in b) was measured off the test structure formed on a first wafer, wherein the measured diffraction signal obtained in e) was measured off the in-die structure formed on a second wafer, and wherein the one or more features determined in g) are of the in-die structure formed on the second wafer.

12. The method of claim 11, wherein g) comprises:
comparing the measured diffraction signal obtained in e) to a library of simulated diffraction signals and corresponding hypothetical profiles of the in-die structure to determine a closest matching simulated diffraction signal in the library, wherein the measured diffraction signal obtained in e) is compared only to simulated diffraction signals in the library with corresponding hypothetical profiles having one or more profile parameters corresponding to the one or more profiles parameters in f) with the same values as fixed in f); and
determining the one or more features of the in-die structure based on the hypothetical profile of the in-die structure in the library corresponding to the closest matching simulated diffraction signal.

13. The method of claim 11, wherein f) comprises:
generating a first simulated diffraction signal using a first hypothetical profile of the in-die structure using the values of the one or more profile parameters fixed in f);
comparing the measured diffraction signal to the first simulated diffraction signal;
if the measured diffraction signal and the first simulated diffraction signal match within a matching criterion, determining one or more features of the in-die structure based on the first hypothetical profile; and
if the measured diffraction signal and the first simulated diffraction signal do not match within the matching criterion, generating a second simulated diffraction signal using a second hypothetical profile of the in-die structure and the values for the one or more profile parameters fixed in f) and comparing the measured diffraction signal to the second simulated diffraction signal.

14. The method of claim 11, wherein the in-die structure has a bottom structure and a top structure, and wherein the test structure corresponds only to the bottom structure of the in-die structure.

15. The method of claim 14, wherein the measured diffraction signal obtained in b) is obtained before the top structure of the in-die structure is formed, and wherein the measured diffraction signal obtained in e) is obtained after the top section of the in-die structure is formed.

16. A method of determining one or more features of an in-die structure on a semiconductor wafer using optical metrology, wherein a test structure corresponding to the in-die structure is formed in a test pad adjacent to the in-die structure on the wafer, the method comprising:
a) obtaining a measured diffraction signal measured off the test structure;
b) determining one or more features of the test structure using the measured diffraction signal obtained in a); and
c) determining one or more features of the in-die structure based on the one or more features of the test structure determined in b) and a correlation between one or more features of the test structure and one or more features of the corresponding in-die structure, wherein the correlation was determined in advance of steps a), b), and c).

17. The method of claim 16, wherein b) comprises:
comparing the measured diffraction signal obtained in a) to a library of simulated diffraction signals and corresponding hypothetical profiles of the test structure to determine a closest matching simulated diffraction signal in the library; and
determining the one or more features of the test structure based on the hypothetical profile of the test structure in the library corresponding to the closest matching simulated diffraction signal.

18. The method of claim 16, wherein b) comprises:
generating a first simulated diffraction signal using a first hypothetical profile of the test structure;
comparing the measured diffraction signal to the first simulated diffraction signal;
if the measured diffraction signal and the first simulated diffraction signal match within a matching criterion, determining one or more features of the test structure based on the first hypothetical profile; and if the measured diffraction signal and the first simulated diffraction signal do not match within the matching criterion, generating a second simulated diffraction signal using a second hypothetical profile of the test structure and comparing the measured diffraction signal to the second simulated diffraction signal.

19. The method of claim 16, wherein the one or more features of the in-die structure is determined in c) without obtaining a measured diffraction signal measured off the in-die structure.

20. The method of claim 16, wherein c) comprises:
d) obtaining a measured diffraction signal measured off the in-die structure;
e) fixing values of one or more profile parameters of a hypothetical profile of the in-die structure based on the one or more features of the test structure determined in b); and
f) determining the one or more features of the in-die structure based on the measured diffraction signal obtained in d) and the one or more profile parameters fixed in e).

21. The method of claim 20, wherein f) comprises:
comparing the measured diffraction signal obtained in d) to a library of simulated diffraction signals and corresponding hypothetical profiles of the in-die structure to determine a closest matching simulated diffraction signal in the library, wherein the measured diffraction signal obtained in d) is compared only to simulated diffraction signals in the library with corresponding hypothetical profiles having one or more profile parameters corresponding to the one or more profiles parameters in e) with the same values as fixed in e); and
determining the one or more features of the in-die structure based on the hypothetical profile of the in-die structure in the library corresponding to the closest matching simulated diffraction signal.

22. The method of claim 20, wherein f) comprises:
generating a first simulated diffraction signal using a first hypothetical profile of the in-die structure using the values of the one or more profile parameters fixed in e);
comparing the measured diffraction signal to the first simulated diffraction signal;
if the measured diffraction signal and the first simulated diffraction signal match within a matching criterion, determining one or more features of the in-die structure based on the first hypothetical profile; and
if the measured diffraction signal and the first simulated diffraction signal do not match within the matching criterion, generating a second simulated diffraction signal using a second hypothetical profile of the in-die structure and the values for the one or more profile parameters fixed in e) and comparing the measured diffraction signal to the second simulated diffraction signal.

23. A computer-readable medium containing computer-executable instructions to determine one or more features of an in-die structure to be formed on a semiconductor wafer using optical metrology, wherein a test structure corresponding to the in-die structure is to be formed in a test pad adjacent to the in-die structure on the wafer, comprising instructions for:
a) obtaining a measured diffraction signal measured off the test structure;
b) determining one or more features of the test structure using the measured diffraction signal obtained in a); and
c) determining one or more features of the in-die structure based on the one or more features of the test structure determined in b) and a correlation between one or more features of the test structure and one or more features of the corresponding in-die structure, wherein the correlation was determined in advance of steps a), b), and c).

24. The computer-readable medium of claim 23, wherein b) comprises instructions for:
comparing the measured diffraction signal obtained in a) to a library of simulated diffraction signals and corresponding hypothetical profiles of the test structure to determine a closest matching simulated diffraction signal in the library; and
determining the one or more features of the test structure based on the hypothetical profile of the test structure in the library corresponding to the closest matching simulated diffraction signal.

25. The computer-readable medium of claim 23, wherein b) comprises instructions for:
generating a first simulated diffraction signal using a first hypothetical profile of the test structure;
comparing the measured diffraction signal to the first simulated diffraction signal;
if the measured diffraction signal and the first simulated diffraction signal match within a matching criterion, determining one or more features of the test structure based on the first hypothetical profile; and
if the measured diffraction signal and the first simulated diffraction signal do not match within the matching criterion, generating a second simulated diffraction signal using a second hypothetical profile of the test structure and comparing the measured diffraction signal to the second simulated diffraction signal.

26. The computer-readable medium of claim 23, wherein c) comprises instructions for:
d) obtaining a measured diffraction signal measured off the in-die structure;
e) fixing values of one or more profile parameters of a hypothetical profile of the in-die structure based on the one or more features of the test structure determined in b); and
f) determining the one or more features of the in-die structure based on the measured diffraction signal obtained in d) and the one or more profile parameters fixed in e).

27. The computer-readable medium of claim 26, wherein f) comprises instructions for:
comparing the measured diffraction signal obtained in d) to a library of simulated diffraction signals and corresponding hypothetical profiles of the in-die structure to determine a closest matching simulated diffraction signal in the library, wherein the measured diffraction signal obtained in d) is compared only to simulated diffraction signals in the library with corresponding hypothetical profiles having one or more profile parameters corresponding to the one or more profiles parameters in e) with the same values as fixed in e); and
determining the one or more features of the in-die structure based on the hypothetical profile of the in-die structure in the library corresponding to the closest matching simulated diffraction signal.

28. The computer-readable medium of claim 26, wherein f) comprises instructions for:
generating a first simulated diffraction signal using a first hypothetical profile of the in-die structure using the values of the one or more profile parameters fixed in e);
comparing the measured diffraction signal to the first simulated diffraction signal;
if the measured diffraction signal and the first simulated diffraction signal match within a matching criterion, determining one or more features of the in-die structure based on the first hypothetical profile; and if the measured diffraction signal and the first simulated diffraction signal do not match within the matching criterion, generating a second simulated diffraction signal using a second hypothetical profile of the in-die structure and the values for the one or more profile parameters fixed in e) and comparing the measured diffraction signal to the second simulated diffraction signal.

29. A system configured to determine one or more features of an in-die structure to be formed on a semiconductor wafer using optical metrology, wherein a test structure corresponding to the in-die structure is to be formed in a test pad adjacent to the in-die structure on the wafer, the system comprising:
   a correlation between one or more features of the test structure and one or more features of the corresponding in-die structure; and
   a processor configured to:
      a) obtain a measured diffraction signal measured off the test structure;
      b) determine one or more features of the test structure using the measured diffraction signal obtained in a); and
      c) determine one or more features of the in-die structure based on the one or more features of the test structure determined in b) and the correlation between one or more features of the test structure and one or more features of the corresponding in-die structure.

30. The system of claim 29, further comprising:
   a first library of simulated diffraction signals and corresponding hypothetical profiles of the test structure, and
   wherein the processor is configured to:
      compare the measured diffraction signal measured off the test structure to the first library to determine a closest matching simulated diffraction signal in the first library; and
      determine the one or more features of the test structure based on the hypothetical profile of the test structure in the first library corresponding to the closest matching simulated diffraction signal.

31. The system of claim 29, further comprising:
   a first machine learning system configured to generate simulated diffraction signals using hypothetical profiles of the test structure as inputs, and
   wherein the processor is configured to:
   compare the measured diffraction signal to a first simulated diffraction signal generated by the first machine learning system;
   if the measured diffraction signal and the first simulated diffraction signal match within a matching criterion, determine one or more features of the test structure based on a first hypothetical profile used to generate the first simulated diffraction signal; and
   if the measured diffraction signal and the first simulated diffraction signal do not match within the matching criterion, compare the measured diffraction signal to a second simulated diffraction signal generated by the first the machine learning system using a second hypothetical profile of the test structure as input.

32. The system of claim 29, wherein the processor is configured to:
   d) obtain a measured diffraction signal measured off the in-die structure;
   e) fix values of one or more profile parameters of a hypothetical profile of the in-die structure based on the one or more features of the test structure determined in b); and
   f) determine the one or more features of the in-die structure based on the measured diffraction signal obtained in d) and the one or more profile parameters fixed in e).

33. The system of claim 32, further comprising:
   a second library of simulated diffraction signals and corresponding hypothetical profiles of the in-die structure, and
   wherein the processor is configured to:
   compare the measured diffraction signal obtained in d) to the second library to determine a closest matching simulated diffraction signal in the second library, wherein the measured diffraction signal is compared only to simulated diffraction signals in the second library with corresponding hypothetical profiles having one or more profile parameters corresponding to the one or more profiles parameters in e) with the same values as fixed in e); and
   determine the one or more features of the in-die structure based on the hypothetical profile of the in-die structure in the second library corresponding to the closest matching simulated diffraction signal.

34. The system of claim 32, further comprising:
   a second machine learning system configured to generate simulated diffraction signals using hypothetical profiles of the in-die structure using the values of the fixed one or more profile parameters as inputs, and
   wherein the processor is configured to:
   compare the measured diffraction signal to a first simulated diffraction signal generated by the second machine learning system;
   if the measured diffraction signal and the first simulated diffraction signal match within a matching criterion, determine one or more features of the in-die structure based on a first hypothetical profile used to generate the first simulated diffraction signal; and
   if the measured diffraction signal and the first simulated diffraction signal do not match within the matching criterion, compare the measured diffraction signal to a second simulated diffraction signal generated by the second machine learning system using a second hypothetical profile of the in-die structure as input.

* * * * *